US011623550B2

(12) United States Patent
Stapleton

(10) Patent No.: US 11,623,550 B2
(45) Date of Patent: Apr. 11, 2023

(54) VEHICLE SEAT WITH TORSION BAR SPRING

(71) Applicant: Brose Fahrzeugteile SE & Co. Kommanditgesellschaft, Coburg, Coburg (DE)

(72) Inventor: Dakota Stapleton, Flushing, MI (US)

(73) Assignee: Brose Fahrzeugteile SE & Co. Kommanditgesellschaft, Coburg

( * ) Notice: Subject to any disclaimer, the term of this patent is extended or adjusted under 35 U.S.C. 154(b) by 70 days.

(21) Appl. No.: 17/395,162

(22) Filed: Aug. 5, 2021

(65) Prior Publication Data
US 2023/0042079 A1 Feb. 9, 2023

(51) Int. Cl.
*B60N 2/22* (2006.01)
*B60N 2/30* (2006.01)

(52) U.S. Cl.
CPC ............. *B60N 2/3047* (2013.01); *B60N 2/22* (2013.01); *B60N 2/3009* (2013.01)

(58) Field of Classification Search
CPC ....... B60N 2/22; B60N 2/3009; B60N 2/3047
See application file for complete search history.

(56) References Cited

U.S. PATENT DOCUMENTS

| | | | | |
|---|---|---|---|---|
| 5,645,316 A | * | 7/1997 | Aufrere | B60N 2/42781 297/483 |
| 8,888,191 B2 | * | 11/2014 | Hosokawa | B60N 2/68 297/452.18 |
| 8,931,850 B2 | * | 1/2015 | Mitsuhashi | B60N 2/3013 297/452.2 |
| 9,481,278 B2 | * | 11/2016 | Mitsuhashi | B60N 2/68 |
| 9,545,857 B2 | * | 1/2017 | Cooley | B60N 2/3065 |
| 10,081,280 B2 | * | 9/2018 | Furukawa | B60N 2/68 |
| 10,518,663 B1 | * | 12/2019 | Kakishima | B60N 2/0155 |
| 10,543,760 B2 | * | 1/2020 | Yamabe | B60N 2/4221 |
| 10,960,789 B2 | * | 3/2021 | Motoi | B60N 2/22 |
| 2012/0242124 A1 | * | 9/2012 | Tanabe | B60N 2/433 297/216.14 |

FOREIGN PATENT DOCUMENTS

WO WO-2015004008 A1 * 1/2015 ............... B60N 2/06

* cited by examiner

*Primary Examiner* — Syed A Islam
(74) *Attorney, Agent, or Firm* — Dickinson Wright PLLC

(57) ABSTRACT

A vehicle seat includes a back frame having opposing side members and side brackets pivotally connected to the opposing side members about a pivot axis such that the back frame is pivotal between a reclined position and a folded position. A spring-assist system is configured to urge pivoting of the back frame towards the folded position. The spring-assist system including a torsion rod spring extending between the side members at a location that is radially outboard of the pivot axis to generate an off-axis moment that urges the back frame towards the folded position.

20 Claims, 3 Drawing Sheets

VEHICLE SEAT WITH TORSION BAR SPRING

TECHNICAL FIELD

The present disclosure relates to vehicle seats.

BACKGROUND

A vehicle seat may include seat bottom and a seat back that are pivotally attached to each other so that the seat back may move between different angles relative to the seat bottom. One or more recline mechanisms may be used to connect the seat bottom to the seat back. The recline mechanisms are actuatable to permit rotation of the seat back and are actuatable to lock the position of the seat back. The seat may include a biasing mechanism that automatically rotates the seat back in response to the recline mechanism being actuated.

SUMMARY

According to one embodiment, a vehicle seat includes a back frame having opposing side members and side brackets pivotally connected to the opposing side members about a pivot axis such that the back frame is pivotal between a reclined position and a folded position. A spring-assist system is configured to urge pivoting of the back frame towards the folded position. The spring-assist system including a torsion rod spring extending between the side members at a location that is radially outboard of the pivot axis to generate an off-axis moment that urges the back frame towards the folded position.

According to another embodiment, a vehicle seat includes a back frame foldable about a first axis and a cushion frame pivotally attached to the back frame about a second axis that is not coaxial with the first axis. A first torsion rod spring is biased to fold the back frame towards cushion frame. The first torsion rod spring has a first portion connected to the back frame, a second portion connected to the cushion frame, and a central portion extending from the first portion, across the back frame, and to the second portion. The central portion is radially outboard of the first axis.

According to yet another embodiment, a vehicle seat includes a back frame pivotal about a first axis and having first and second side members. The seat further includes a cushion frame having first and second lateral brackets pivotally attached to the first and second side members, respectively, about a second axis that is not coaxial with the first axis. A first torsion rod spring has a first end connected to the first side member and a second end connected to the second lateral bracket. A second torsion rod spring has a first end connected to the second side member and a second end connected to the first lateral bracket. The first and second torsion rods are configured to pivot the back frame about the first axis.

DETAILED DESCRIPTION

Figure 1:
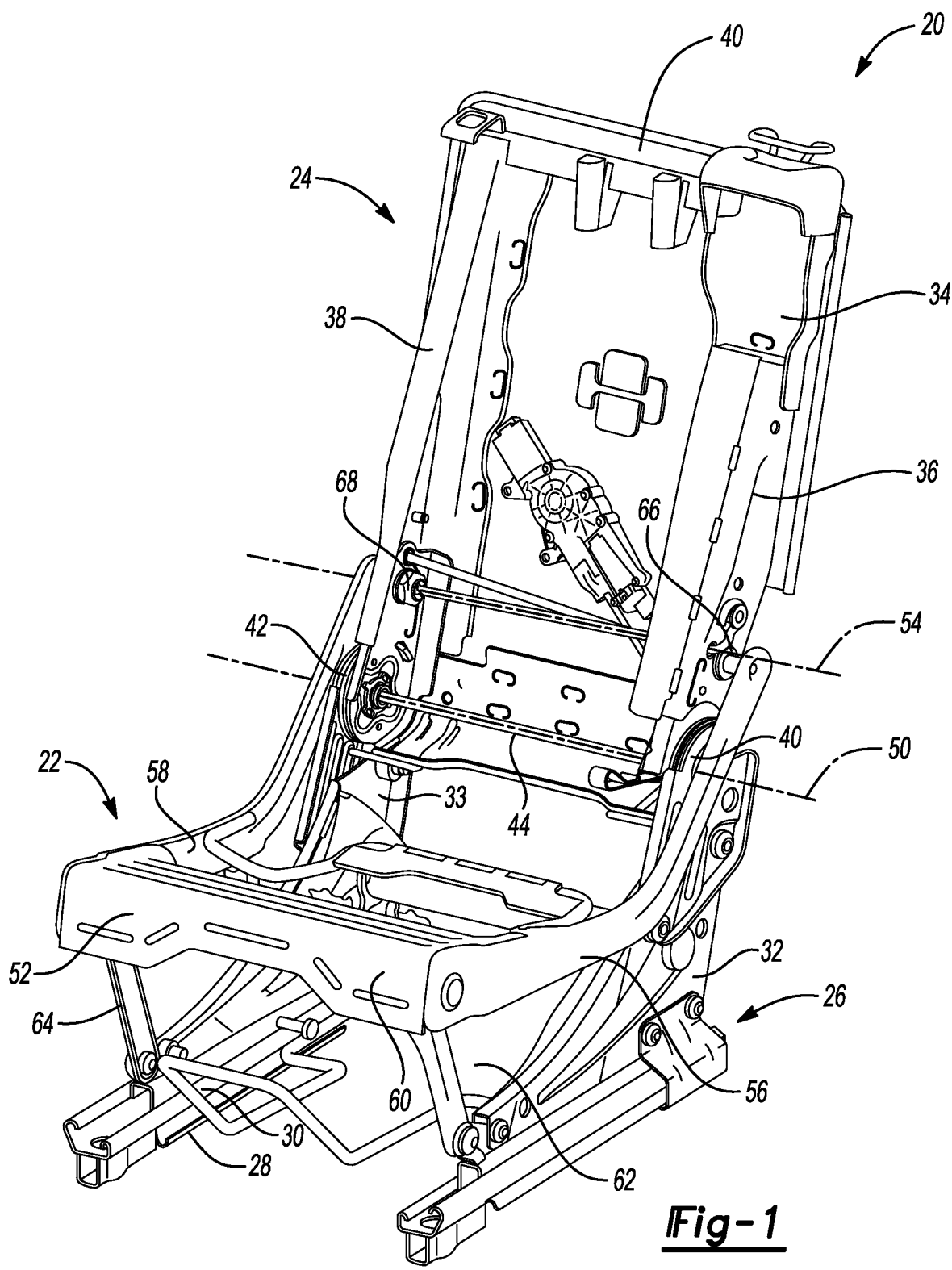
FIG. 1 is a perspective view of a vehicle seat.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein, such as front, back, end, side, etc., are made with reference to the views and orientations shown in the exemplary figures and are not to be interpreted as limiting the disclosed concept to the illustrated embodiments or any specific spatial orientation. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 2:
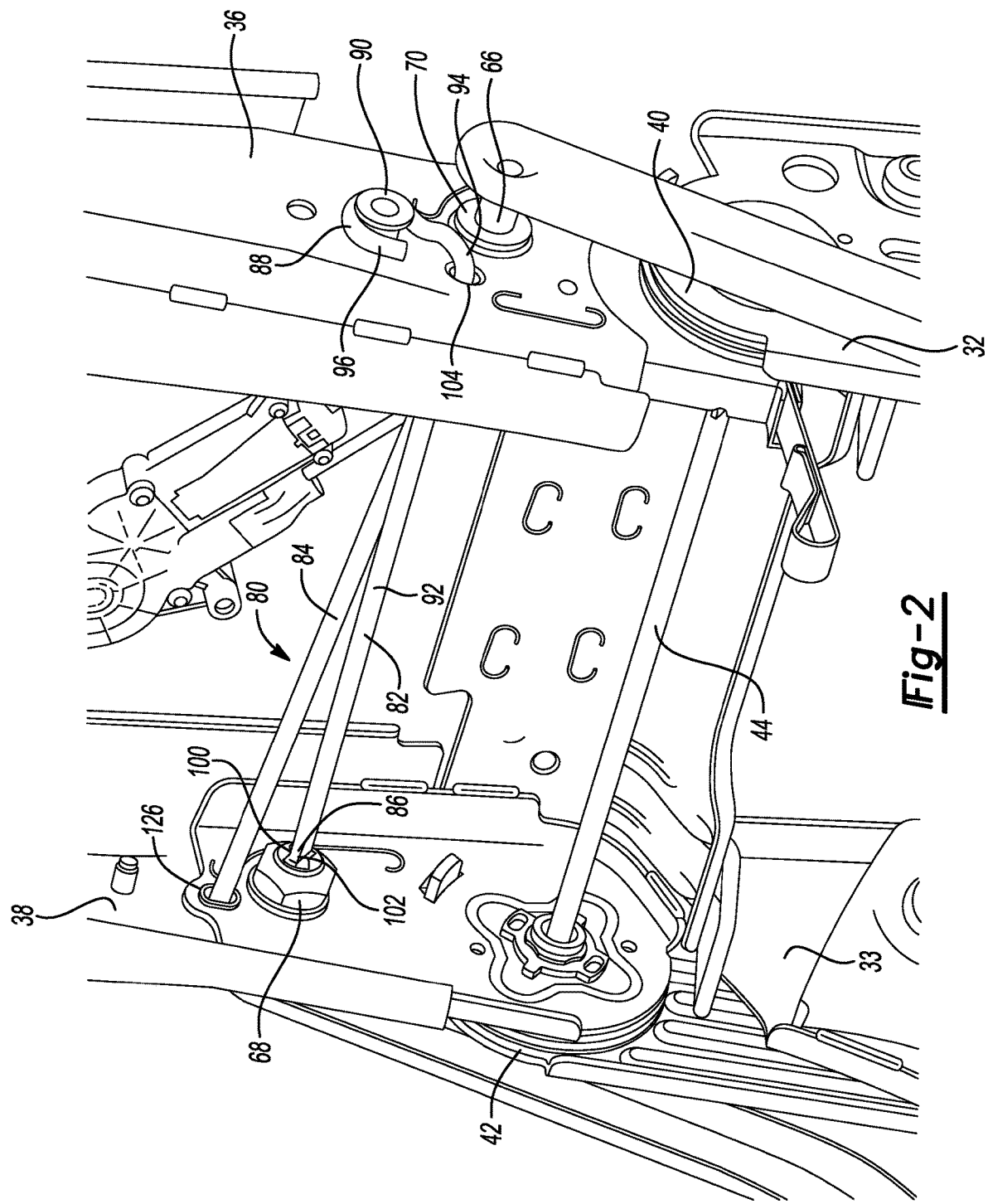
FIG. 2 is a magnified perspective view of the vehicle seat looking from the right side.

Referring to FIGS. 1 and 2, a vehicle seat 20 includes a seat bottom 22 and a seat back 24. The seat back 24 is pivotally attached to the seat bottom 22 allowing for different angles of recline and/or folding forward and/or fold-flat positions. In the illustrated embodiment, the seat 20 is for a second or third row of a vehicle and is capable of a fold-flat position in which the seat back 24 is folded forward and over the seat bottom 22 to be substantially horizontal relative to the vehicle floor. In other embodiments, the seat 20 may be utilized in the front row of the vehicle.

The seat 20 may be attached to a floor of the vehicle through rail assemblies 26 allowing fore-and-aft adjustment or by stationary attachment. The example rail assembly 26 includes a lower rail 28 fixed to the floor and an upper rail 30 fixed to the seat 20. The upper rail 30 is slidable relative to the lower rail 28 to allow the fore-and-aft adjustment.

Lower side brackets 32, 33 are attached to the upper rails 30 and generally form a fixed portion of the seat bottom 22. A back frame 34 of the seat back 24 is pivotally attached to the lower side brackets 32, 33. For example, the back frame 34 may include a pair of opposing side members 36, 38 that generally extend along opposite sides of a backplate 41. The side members 36, 38 are attached to the brackets 32, 33 by recline mechanisms 40, 42. The recline mechanisms 40, 42 include first portions fixed to the side members 36, 38 and second portions fixed to the lower brackets 32, 33. Each of the recline mechanisms may include an actuatable member (s) configured to lock the first and second portions relative to each to hold the seat back 24 at a particular angle and configured to unlock allowing pivoting of the seat back 24. A traverse member 44, e.g., a rod, extends between the recline mechanisms 40, 42 to synchronize movement therebetween. One of the recline mechanisms may include a handle, pull strap, or the like (see FIG. 3) that may be actuated by a user to unlock the recline mechanisms and allow pivoting of the seat back 24 to either increase the amount of recline or to fold the seat back 24 forward. The back frame 34 is pivotal relative to the lower side brackets 32, 33 about a pivot axis 50 (also referred to as a recline axis) that extends through the recline mechanisms 40, 42.

A cushion frame 52 forms a movable portion of the seat bottom 22. The cushion frame 52 is movable relative to the side brackets 32, 33 and is pivotally attached to the back frame 34 about a second pivot axis 54 that is not coaxial with the first pivot axis 50. The cushion frame 52 may include a pair of lateral brackets 56, 58 interconnected by one or more front traverse members 60. Linkages 62, 64 connect the front portion of the cushion frame 52 to either the upper rails 30 or the side brackets 32, 33. The cushion frame 52 may be connected to the back frame 34 via posts 66, 68. The first post 66 may be fixed to the lateral bracket 56, such as by welding, and extends laterally therefrom to be received through holes 70 defined through the side member 36 and the side bracket 32. A bushing, bearing, or the like facilitates rotation of the first post 66 relative to the back frame 34. The second post 68 is similarly structured and extends through the side member 38 and the bracket 33. Snap rings (not shown) may secure the posts 66, 68 within the holes.

The movable cushion frame 52 in cooperation with the seat back 24 allows the seat 20 to be folded to a fold-flat position in which a backside of the seat back 24 is generally horizontal. The seat 20 may be folded by operating the handle or pull strap associated with the recline mechanism 40 or 42. This rotationally releases the seat back 24 from the seat bottom 22 allowing the seat back to be pivoted forward about the first axis 50. This pivoting of the seat back 24 causes the lateral brackets 56, 58 to move forward which in turn causes the linkages 62, 64 to pivot forwardly about their lower mounts.

Figure 3:
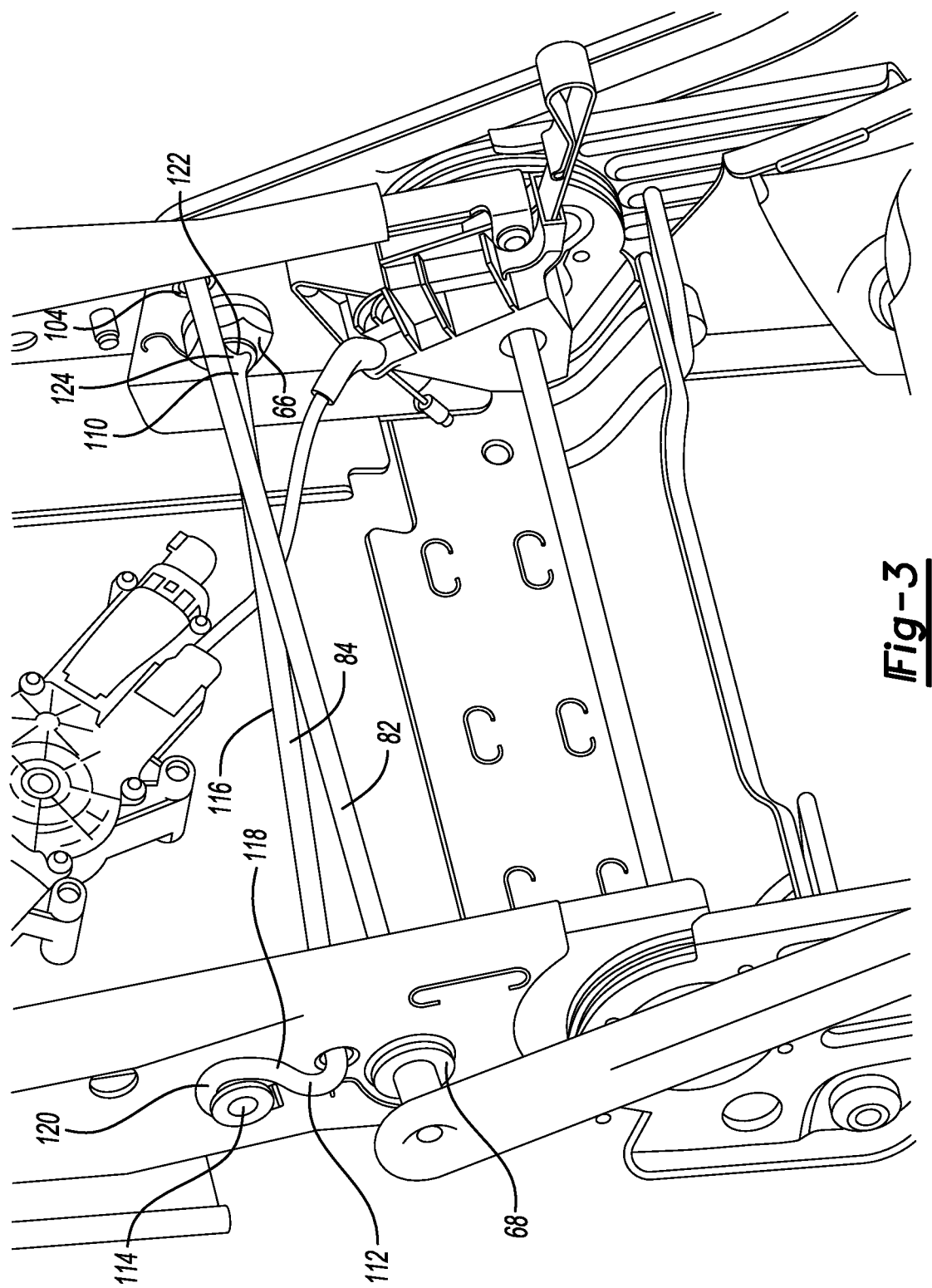
FIG. 3 is a magnified perspective view of the vehicle seat looking from the left side.

Referring to FIGS. 2 and 3, the seat 20 may include a spring-assist system 80 that aids pivoting of the seat back 24. The spring-assist system 80 may bias the seat back 24 to a folded position, bias the seat back 24 to a reclined position, or may bias the seat back 24 in both directions. In one embodiment, the spring-assist system 80 automatically folds the seat 22 to the fold-flat position in response to the user releasing the recline mechanisms. In another embodiment, the spring-assist system 80 automatically pivots the seat back from the folded position to a reclined position in response to the user releasing the recline mechanism when the seat is folded flat. In yet another embodiment, the spring-assist system biases the seat back 24 to an intermediate position in response to the lever/strap being pulled.

The spring-assist system 80 may include one or more torsion rod springs. For example, the system may have a first torsion rod spring 82 and a second torsion rod spring 84. The torsion rods 82, 84 generally extend across the width (also known as lateral, transverse, or crosswise direction) of the back frame 34. Each of the torsion rods 82, 84 generally extends from one of the side members 36 to the other of the side members 38.

The torsion rod 82 may include a first end portion 86 connected to the post 68, a second end portion 88 connected to the side member 36 (such as by a fastener 90), and a central portion 92 that connects between the first and second end portions. The first end portion 86 may be coaxial with the central portion 92, whereas the second end portion 88 may extend radially outward from the central portion 92 to create a moment arm. The second end portion 88 may include a radially extending arm 94 and a hook 96 that wraps around the fastener 90. Alternatively, the second end portion 88 may be fixed to the side member without a moment arm. This interface may be similar to the interface at the first end portion 86 in where a post is fixed relatively rigid to the side member. Here, a moment arm will not be present, but torque can still be generated by the spring due to the first end portion rotating relative to the second end portion, regardless of end portion shapes.

The post 68 may include a first connection feature 100 that cooperates with a second connection feature 102 of the first end portion 86. The connection features prevent relative rotation between the post 68 and the first end portion 86. For example, the first connection feature 100 is a recessed slot that receives a similarly shaped projection on or at the terminus of the end portion 86. In the illustrated embodiment, the recessed slot is rectangular, and the terminus is formed to have a rectangular shape that is received within the slot. This, of course, is just one example and any type of non-rotatable connection may be used to secure the torsion rod 82 to the post 68. The second end portion 88 may be attached to either the inside of the side member 36 or on the outside as shown. In the illustrated embodiment, the side member 36 defines a hole 104 allowing the torsion rod spring 82 to extend therethrough and attach on the outside of the side member 36. The torsion rod 82 may be angled, i.e., the post 68 and the first end portion 86 are mounted lower than the hole 104.

The torsion rod 84 may include a first end portion 110 connected to the post 66, a second end portion 112 connected to the side member 38 (such as by a fastener 114), and a central portion 116 that connects between the first and second end portions. The first end portion 110 may be coaxial with the central portion 116, whereas the second end portion 112 may extend radially outward from the central portion 116 to create a moment arm. Alternatively, the second end may not include a moment arm as discussed above with torsion rod 82. The second end portion 112 may include a radially extending arm 118 and a hook 120 that wraps around the fastener 114. The post 66 may include a first connection feature 122 that cooperates with a second connection feature 124 of the first end portion 86. The connection features 122 and 124 may be similar to the above-described connection features 100 and 102. The second end portion 112 may be attached to either the inside of the side member 38 or on the outside as discussed above. The torsion rod 84 may be angled, i.e., the post 66 and the first end portion 110 are mounted lower than the hole 126. The torsion rod spring 82 is angled opposite to the torsion rod 84 creating a crisscross of the torsion rods between the side members 36 and 38.

The torsion rod spring(s) bias the seat back 24 through torsion (twisting) of the central portions of the rod springs. For example, pivoting of the seat back 24 from an at-rest position causes the second end portion of the rod spring to rotate relative to the fixed first end portion creating a twist or torsion in the central portion. This twist stores potential energy that becomes kinetic energy when the seat is released resulting in rotation of the seat back. That is, the torsion rod naturally seeks to untwist when not acted upon by an external force. In one embodiment, the torsion rods 82, 84 are at rest (no torsion) when the seat back 24 is in the fold forward position. Rotating the seat back 24 to the reclined position rotates the moment arms relative to the fixed ends at the posts creating torsion. The reclined mechanisms are configured to resist this torsion and maintain the seat back at the desired reclined position. If the recline mechanisms are unlocked, the torsion bars untwist back towards their rest positions causing the seat back 24 to fold forward. The same principle may be applied to bias the seat back in any direction desired. For example, seat back could be biased to a reclined position or to an intermediate position to allow biasing in both directions. The direction of the biased as well as the spring torque can be tuned by adjusting the rotational position of the connection features on the posts to create more or less twist in the torsion rod springs.

Referring back to FIG. 1, the torsion rods 82, 84 are not coaxial with the recline axis 50 and instead are radially outboard of the axis 50. In the illustrated embodiment, the torsion rod springs 82, 84 are above the recline axis 50. This placement of the torsion rod springs creates an off-axis moment (off-axis from the recline axis 50) that urges the back frame 34 to rotate in the direction of bias.

The seat 20 may not require a pair of torsion rod springs and in some embodiments may only include one. Including a second rod spring, as shown, may provide smoother pivoting of the seat back due to increased balance. The above-described torsion rod spring places the spring-assist system within the center of the seat back and away from the recline mechanisms and the outer surfaces of the back frame. This may reduce the overall package of the seat, simplify assembly of the recline mechanisms, and reduce interference with trimming and cushioning of seat.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST seat bottom 22
seat back 24
rail assemblies 26
lower rail 28
upper rails 30
side bracket 32
bracket 33
back frame 34
side member 36
side member 38
recline mechanism 40
recline mechanisms 42
member 44
recline axis 50
cushion frame 52
second pivot axis 54
lateral bracket 56
lateral bracket 58
members 60
linkage 62
linkage 64
post 66
post 68
hole 70
spring-assist system 80
first torsion rod spring 82
second torsion rod spring 84
first end portion 86
second end portion 88
fastener 90
central portion 92
arm 94
hook 96
first connection feature 100
second connection feature 102
hole 104
first end portion 110
second end portion 112
fastener 114
central portion 116
arm 118
hook 120
first connection feature 122
second connection feature 124
hole 126

What is claimed is:

1. A vehicle seat comprising:
a back frame having opposing side members;
side brackets pivotally connected to the opposing side members about a pivot axis such that the back frame is pivotal between a reclined position and a folded position; and
a spring-assist system configured to urge pivoting of the back frame towards the folded position, the spring-assist system including a torsion rod spring extending between the side members at a location that is radially outboard of the pivot axis to generate an off-axis moment that urges the back frame towards the folded position.

2. The vehicle seat of claim 1, wherein the torsion rod spring has a first end fixed to one of the side members and a second end that is rotatable relative the other of the side members.

3. The vehicle seat of claim 1 further comprising a cushion frame movable relative to the side brackets and pivotally attached to the back frame about a second pivot axis that is not coaxial with the pivot axis.

4. The vehicle seat of claim 3, wherein the torsion rod has a first end connected to the cushion frame and a second end connected to one of the side members.

5. The vehicle seat of claim 4, wherein the first end is connected to the cushion frame at the second pivot axis and the second end is connected to the one of the side members at a location that is radially outboard of the second pivot axis.

6. The vehicle seat of claim 1, wherein the spring-assist system further includes a second torsion rod spring extending between the side members at a location that is radially outboard of the pivot axis to generate a second off-axis moment that urges the back frame towards the folded position.

7. The vehicle seat of claim 6, wherein the torsion rod spring and the second torsion rod spring crisscross each other.

8. The vehicle seat of claim 6, wherein the torsion rod spring has a first end attached to a first of the side members and a second end adjacent to a second of the side members, and the second rod spring has a first end attached to the second side member and a second end adjacent to the first side member.

9. The vehicle seat of claim 8 further comprising a cushion frame movable relative to the side brackets and pivotally attached to the back frame, wherein the second ends are attached to the cushion frame.

10. The vehicle seat of claim 1 further comprising a post extending through one of the side members and coupled to an end of the torsion rod.

11. The vehicle seat of claim 10, wherein the post defines a first connection feature and the end defines a second connection feature that cooperates with the first connection feature to couple the torsion rod to the post such that the post and the end are rotationally fixed relative to each other.

12. The vehicle seat of claim 11, wherein the first connection feature is a slot and the second connection feature is a projection having a geometry that matches the slot such that the end is receivable in the post in a non-rotatable manner.

13. The vehicle seat of claim 1 further comprising:
a pair of recline mechanisms pivotally connecting the back frame to the side brackets; and
a traverse member extending between the recline mechanisms.

14. A vehicle seat comprising:
a back frame foldable about a first axis;
a cushion frame pivotally attached to the back frame about a second axis that is not coaxial with the first axis; and
a first torsion rod spring biased to fold the back frame towards cushion frame, the first torsion rod spring having a first portion connected to the back frame, a second portion connected to the cushion frame, and a central portion extending from the first portion, across the back frame, and to the second portion, wherein the central portion is radially outboard of the first axis.

15. The vehicle seat of claim 14, wherein the first portion extends radially relative to the central portion and the second portion is coaxial with the central portion.

16. The vehicle seat of claim 14 further comprising a second torsion rod spring biased to fold the back frame towards cushion frame, the second torsion rod spring having a first portion connected to the back frame, a second portion connected to the cushion frame, and a central portion extending from the first portion, across the back frame, and to the second portion, wherein the central portion of the second torsion rod spring is radially outboard of the first axis.

17. The vehicle seat of claim 14 further comprising a post having a first side rotationally fixed to the cushion frame and a second side rotationally fixed to the second portion of the torsion rod.

18. A vehicle seat comprising:
a back frame pivotal about a first axis and having first and second side members;
a cushion frame including first and second lateral brackets pivotally attached to the first and second side members, respectively, about a second axis that is not coaxial with the first axis;
a first torsion rod spring having a first end connected to the first side member and a second end connected to the second lateral bracket; and
a second torsion rod spring having a first end connected to the second side member and a second end connected to the first lateral bracket, wherein the first and second torsion rods are configured to pivot the back frame about the first axis.

19. The vehicle seat of claim 18 further comprising:
a first post connected between the first lateral bracket and the second end of the second torsion rod spring; and
a second posted connected between the second lateral bracket and the second end of the first torsion rod spring.

20. The vehicle seat of claim 19, wherein the first post defines a first connection feature and the second end of the second torsion rod spring defines a second connection feature that cooperates with the first connection feature to non-rotatably couple the second torsion rod to the first post.

* * * * *